United States Patent
Liccardo

(10) Patent No.: US 8,065,074 B1
(45) Date of Patent: Nov. 22, 2011

(54) CONFIGURABLE INERTIAL NAVIGATION SYSTEM WITH DUAL EXTENDED KALMAN FILTER MODES

(75) Inventor: Darren S. Liccardo, San Jose, CA (US)

(73) Assignee: Memsic Transducer Systems Co., Ltd., Wuxi, Jiangsu Province (CN)

( * ) Notice: Subject to any disclaimer, the term of this patent is extended or adjusted under 35 U.S.C. 154(b) by 743 days.

(21) Appl. No.: 12/206,566

(22) Filed: Sep. 8, 2008

Related U.S. Application Data

(60) Provisional application No. 60/976,529, filed on Oct. 1, 2007.

(51) Int. Cl.
*G01C 21/00* (2006.01)

(52) U.S. Cl. ....... 701/200; 702/141; 702/151; 73/503.3; 73/504.03

(58) Field of Classification Search .................. 701/200, 701/201; 702/151, 141; 73/504.04, 503.3, 73/504.03, 514.01; *G01C 21/00*
See application file for complete search history.

(56) References Cited

U.S. PATENT DOCUMENTS

| | | | |
|---|---|---|---|
| 6,853,947 B1 | 2/2005 | Horton | |
| 7,512,493 B2 * | 3/2009 | Morgan et al. | 701/214 |
| 7,526,402 B2 * | 4/2009 | Tanenhaus et al. | 702/151 |
| 2003/0149528 A1 * | 8/2003 | Lin | 701/214 |
| 2005/0090947 A1 * | 4/2005 | Wise | 701/6 |
| 2005/0240347 A1 * | 10/2005 | Yang | 701/220 |
| 2006/0208941 A1 * | 9/2006 | Ring et al. | 342/357.02 |
| 2007/0213933 A1 * | 9/2007 | Zeng et al. | 701/220 |
| 2008/0004796 A1 * | 1/2008 | Schott et al. | 701/201 |
| 2010/0049439 A1 * | 2/2010 | Cho et al. | 701/216 |

* cited by examiner

*Primary Examiner* — Tuan C To
(74) *Attorney, Agent, or Firm* — Weingarten, Schurgin, Gagnebin & Lebovici LLP

(57) ABSTRACT

A system and method for more accurately and robustly estimating navigation state of a vehicle by adaptively processing signals from an inertial sensor assembly and other sensors. A navigation system receives signals from two or more sensors to evaluate and correct the attitude estimated by an Extended Kalman Filter (EKF). The navigation system selects sensor signals from the other sensor assemblies and processes the selected sensor signals in conjunction with estimates from the inertial navigation module to obtain more accurate estimates of the attitude. The parameters and conditions for using certain sensor signals may be adjusted based on the characteristics and configuration of the vehicle.

20 Claims, 13 Drawing Sheets

CONFIGURABLE INERTIAL NAVIGATION SYSTEM WITH DUAL EXTENDED KALMAN FILTER MODES

CROSS-REFERENCE TO RELATED APPLICATION

This application claims priority under 35 U.S.C. §119(e) to co-pending U.S. Provisional Patent Application No. 60/976,529 entitled "Dynamic Platform Configuration and Navigation Mode Switching Framework for Inertial Systems," filed on Oct. 1, 2007, which is incorporated by reference herein in its entirety.

FIELD OF THE INVENTION

This invention relates to an inertial navigation system for tracking position, orientation and velocity of a vehicle, and more specifically to inertial navigation system with improved tracking capability.

BACKGROUND OF THE INVENTION

Modern vehicles need precise information about their navigation state such as position, velocity, attitude, and related dynamical states to perform their functions. For example, a robotic airplane may require such navigation state information to point a camera at a target, navigate to a destination, and otherwise control its movement. Inputs from multiple sensors may be needed to determine such navigation state of the vehicle. Conventional techniques for estimating the navigation state mostly rely on macroscopic moving parts or costly optical structures such as ring-laser and fiber-optic gyros. Lower-cost solid state inertial sensors have also been used but their lower performance requires more complex implementation using feedback signals to stabilize the navigation state information over extended periods of time.

In conventional navigation systems using such solid state inertial sensors, algorithms are complex and may require excessive computational resources to take advantage of the feedback signals. The algorithms are often executed in digital signal processors (DSPs) to process the feedback signals. Such software algorithms, however, are often too complex or require excessive computational resources for execution in resource-constrained embedded DSPs.

Further, feedback signals from solid state inertial sensors are prone to errors. Consequently, the navigation state of the vehicle estimated from the feedback signals may become corrupted by the very signals that are intended to provide stabilization to the navigation state information. Conventional methods to guard against sensor errors are inflexible and may not be adjusted according to various vehicle configurations and dynamics.

SUMMARY OF THE INVENTION

Embodiments relate to a method, a navigation system and a computer readable storage medium for estimating navigation state of a vehicle. The navigation state of the vehicle is estimated by either a first navigation algorithm or a second navigation algorithm. To estimate the navigation state, the first navigation algorithm and the second navigation algorithm use a first correction signal and a second correction signal, respectively. The first correction signal may be generated from one set of sensor inputs, and the second correction signal may be generated from another set of sensor inputs. The navigation algorithm to be used may be selected based on predetermined criteria such as availability or reliability of the sensor inputs.

In one embodiment, the navigation system may switch from one navigation algorithm to another navigation algorithm after detecting a predetermined event. The predetermined event may include deterioration of sensor inputs or a user input. By using different navigation algorithms based on quality or availability of the sensor inputs or the user inputs, the navigation state may be computed more accurately and robustly.

In one embodiment, the navigation state information computed using the first navigation algorithm is used for initializing parameters associated with the second navigation algorithm. The parameters for the second navigation algorithm may include, among others, an estimated yaw angle of the vehicle. In this way, transition from the first navigation to the second navigation algorithm may be made seamlessly.

In one embodiment, the navigation system includes a measurement source health detection module for determining whether a sensor input is available or reliable. If a sensor input is determined unavailable or unreliable, the navigation system may switch to a navigation algorithm that does not use or is less affected by the unavailable or unreliable sensor input.

In one embodiment, the first navigation algorithm and the second navigation algorithm implement an Extended Kalman Filter (EKF). To implement the EKF, the navigation system may include a measurement correction module, a time propagation module and a state propagation module. The measurement correction module generates a first correction signal or a second correction signal based on the available and reliable sensor inputs. The time propagation module generates propagation information representing attitude quaternion and tangent velocities of the vehicle based on the first correction signal or the second correction signal. The state propagation module generates state propagation information based on the propagation information.

In one embodiment, the sensor input includes signals provided by an inertial sensor assembly. The navigation system may also compute an accelerometer adjustment factor based on a yaw rate of the vehicle. The accelerometer adjustment factor represents the reliability of the sensor input generated by the inertial sensor assembly. The first correction signal may be generated based on the accelerometer adjustment factor.

In one embodiment, the navigation system receives setting inputs associated with characteristics or application of the vehicle to set parameters used in the first navigation algorithm and the second navigation algorithm. Based on the setting inputs, the navigation system may be configured to compute more reliable navigation state information by taking into account vehicle characteristics and dynamics of the vehicle. The setting inputs, among others, may comprise, an inertial sensor low-pass filter bandwidth, packet output data, packet output rate, system orientation, static yaw tracking behavior, a vehicle track pointing offset, magnetometer environmental bias and scale factor, static and dynamic activity, inertial sensor over-range behavior, turn switch threshold, and selection regarding use of sensors.

DETAILED DESCRIPTION OF INVENTION

Embodiments of the invention relate to a system and method for more accurately and robustly estimating navigation state of a vehicle by adaptively processing signals from an inertial sensor assembly and other sensors. A navigation system receives sensor inputs from two or more sensor assemblies to evaluate and correct the navigation state estimated by an inertial navigation module implementing an Extended Kalman Filter (EKF). Specifically, the navigation system selects sensor signals, generates a correction signal based on the selected sensor signals, and computes estimates of the navigation state by using the correction signals as a feedback signal to the EKF. The sensor signals to be used may be selected and processed based on settings adapted to the characteristics and configuration of the vehicle.

The navigation state information refers to any information associated with the navigation state of a vehicle where the system of the vehicle is commonly assumed to be a Markov process. The navigation state information includes, among others, the position of a vehicle in a local or global coordinate system, orientation or attitude of the vehicle, altitude of the vehicle, and velocity of the vehicle.

Overview of System Architecture

Figure 1:
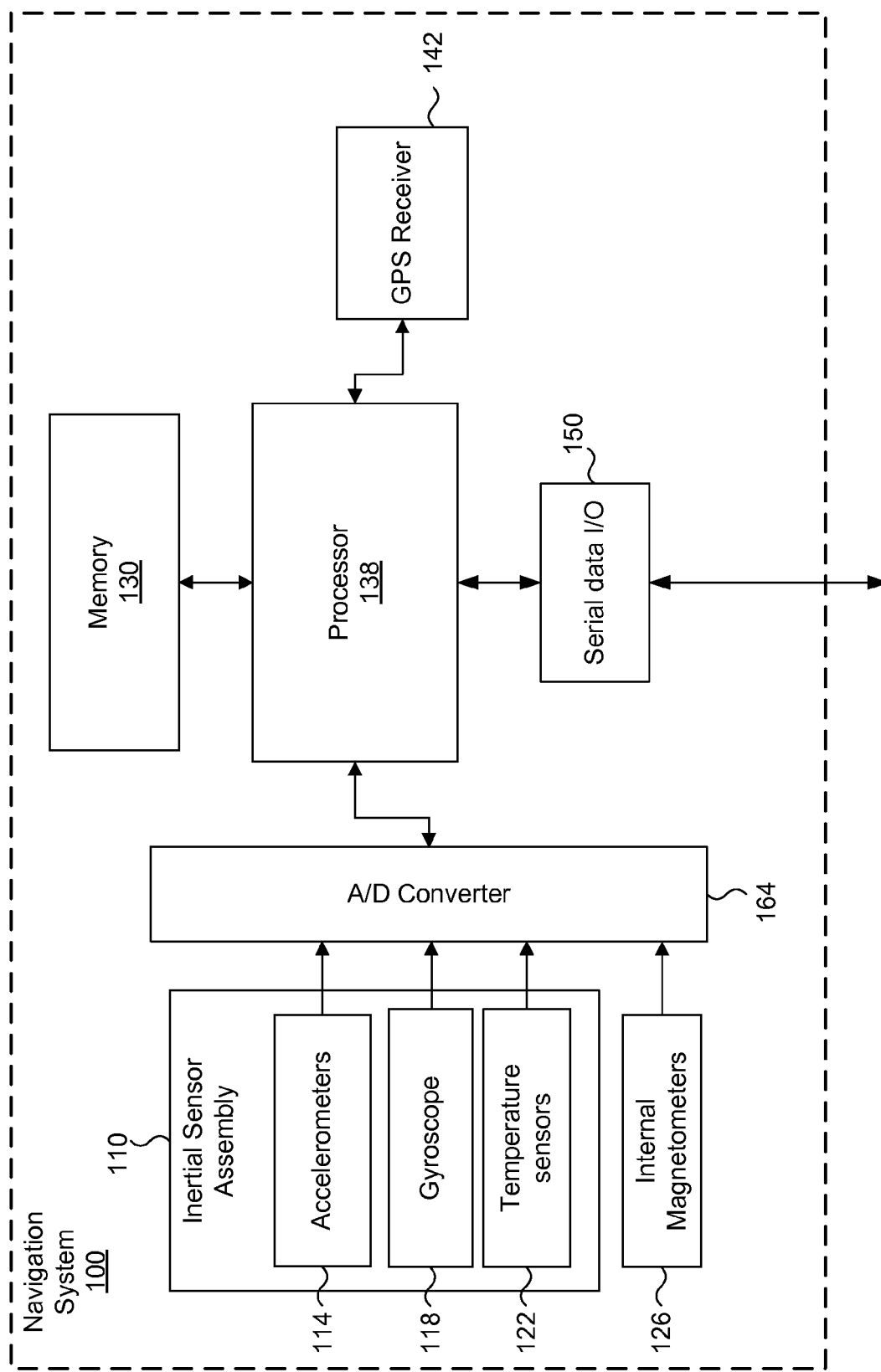
FIG. 1 is a schematic block diagram of a navigation system in accordance with one embodiment.

FIG. 1 is a schematic block diagram of a navigation system 100 in accordance with one embodiment. The navigation system 100 includes, among other components, an inertial sensor assembly 110, internal magnetometers 126, an analog-to-digital (A/D) converter 164, a memory 130, a processor 138, a GPS (Global Positioning System) receiver 142, and a serial data input/output (I/O) 150. The inertial sensor assembly 110 and the internal magnetometers 126 provide analog sensor signals to the A/D converter 164. The A/D converter 164 converts the analog sensor signals into digital signals for processing at the processor 138. The processor 138 is also coupled to the serial I/O 150 to communicate with other input or output devices (not shown). The GPS receiver 142 receives GPS signals from Global Navigation Satellite System (GNSS) and generates the GPS data indicating, among others, the location of the vehicle.

The inertial sensor assembly 110 includes, among other components, accelerometers 114, a gyroscope 118, and temperature sensors 122. In one embodiment, the accelerometers 114 are implemented as orthogonal solid-state accelerometers outputting analog acceleration signals. Each analog acceleration signal may indicate acceleration in the direction of one of three orthogonal axes. The accelerometers 114 are, for example, conventional micro-machined silicon devices. The analog acceleration signal is converted to digital acceleration data at the A/D converter 164 and is fed to the processor 138. The gyroscope 118 generates rate data by sensing the rate of change in the angular displacement about each of three orthogonal axes. The temperature sensors 122 measure temperature at the inertial sensor assembly 110 and provide the temperature data to the processor 138 via the A/D converter 164. The processor 138 calibrates the acceleration (indicated by the acceleration data) and the angular displacement rate (indicated by the rate data) based on the temperature sensed by the temperature sensors 122.

The GPS receiver 142 includes, among other components, a GPS antenna (not shown) for receiving the GPS signals and a GPS processing circuitry (not shown) for processing the GPS signals. The GPS processing circuit processes the GPS signals to generate the GPS data. The processed GPS data is fed to the processor 138 for estimating the navigation state of the vehicle.

The internal magnetometers 126 generate signals indicating heading of the vehicle relative to Earth's magnetic field. The signals from the magnetometers 126 may be converted to digital signal by the A/D converter 164 and fed to the processor 138 to correct the heading of the vehicle. The navigation system 100 may also communicate with external magnetometers (not shown) via the serial data I/O unit 150. As described below in detail with reference to FIG. 7A, the navigation system 100 may estimate the navigation state of the vehicle using either the signal from the internal magnetometers 126 or a signal from the external magnetometers depending on whether a valdMagAid signal is valid.

The processor 138 collects sensor inputs, provides sensor calibration, executes navigation algorithms, and communicates navigation state information through serial data I/O 150. The memory 130 is coupled to the processor to store calibration data, configuration data, and executable code. In one embodiment, the processor 138 is a digital signal processor executing, among others, efficient fixed-point constant-time table lookup routines to calibrate the inertial sensor assembly 110 for temperature bias and inertial scale factor errors. The inertial sensor assembly 110 may be calibrated, for example, using routines as described in Appendix.

The memory 130 may be specially constructed for the required purposes, or it may be a general-purpose computer readable storage devices. The memory includes, and is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions.

The serial data I/O 150 may be used for receiving, among others, sensor inputs from external sensors (not shown), information about vehicle characteristics and dynamics of the vehicle, and user settings for switching between different navigation modes. As described in detail below with reference to FIG. 8, information received via the serial data I/O 150 may be used as parameters for setting a dynamic platform configuration (DPC) framework.

In one embodiment, the navigation system 100 is implemented on a rugged and compact enclosure including all the components therein. The navigation system 100 may receive signals from external sensors (not shown). In another embodiment, the navigation system 100 is implemented on a general purpose computer device coupled with sensor assemblies.

Figure 2:
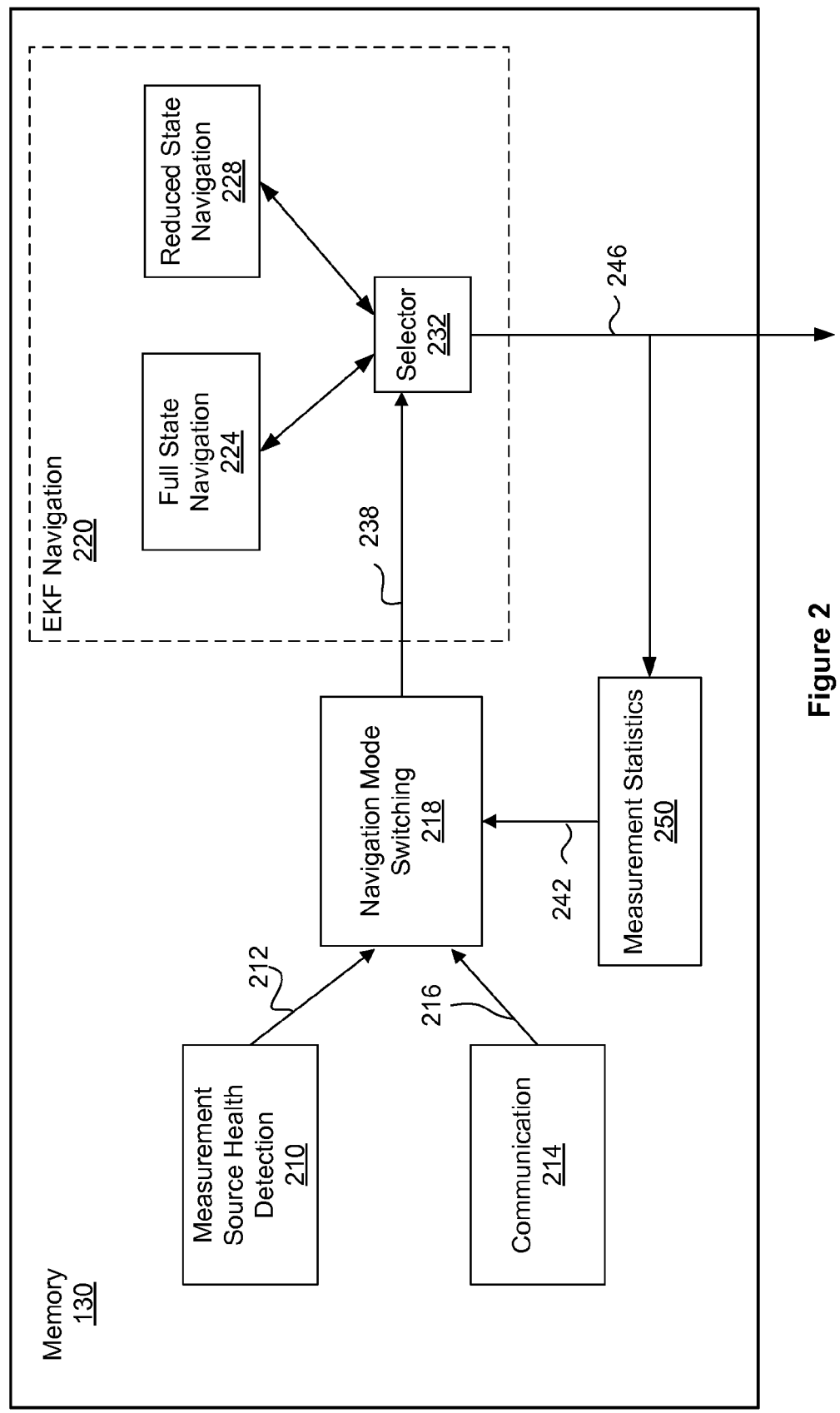
FIG. 2 is a block diagram of software components of the navigation system, in accordance with one embodiment.

FIG. 2 is a block diagram of software components of the navigation system 100 of FIG. 1, in accordance with one embodiment. The memory 130 stores, among other software components, a measurement source health detection module 210, a communication module 214, a navigation mode switching module 218, measurement statistics 250, an inertial navigation module 206, and an Extended Kalman Filter (EKF) navigation algorithm 220. The navigation mode switching module 218 receives health data 212 indicating whether sensor inputs are available or reliable. The communication module 214 stores and implements protocols for communicating with external devices via the serial data I/O module 150. The software components of the memory 130 may, in part or in their entirety, be implemented in software, hardware, firmware or any combinations thereof.

The EKF navigation module 220 receives sensor signals from sensors and generates the navigation state information of the vehicle. In one embodiment, the EKF navigation module 220 includes, among other modules, a full state navigation module 224, reduced state navigation module 228, and a selector 232. The full state navigation module 224 processes sensor inputs received from the internal magnetometers 126, the inertial sensor assembly 110, and external sensors to determine the navigation state of the vehicle as described below in detail with reference to FIG. 4. The reduced state navigation module 228 processes sensor inputs from the magnetometers 126, the GPS receiver 142 and external sensors to determine the navigation state information of the vehicle as described below in detail with reference to FIG. 5. The selector 232 selects either the full state navigation module 224 or the reduced state navigation module 228 for computing the current navigation state information according to a selector signal 238 received from the navigation module switching module 218. The switching mechanism for selecting the navigation modes is described below in detail with reference to FIG. 6.

The measurement statistics 250 stores the navigation state information 246 from the EKF navigation module 220 for reference by the navigation mode switching module 218. In one embodiment, measurement data stored in the measurement statistics 250 include, among others, maximum covariance values of state covariance P, peak and rate-of-change values of y, principle component analysis (PCA) of state covariance P, and singular value decomposition (SVD) of state covariance P.

The measurement source health detection module 210 analyzes the quality of the sensor inputs. If it is determined that a sensor is malfunctioning or providing an unreliable sensor input, the measurement source health detection 210 provides health data 212 indicating that the sensor input is unreliable or of low quality. In one embodiment, the measurement source health detection module 210 further detects whether a certain sensor has been decoupled or deactivated. In this case, the measurement source health detection module 210 generates health data 212 indicating that a sensor input from the sensor is unavailable. The navigation mode switching module 218 may then select a navigation algorithm that does not require or is less susceptible to the unreliable or unavailable sensor input.

Figure 3:
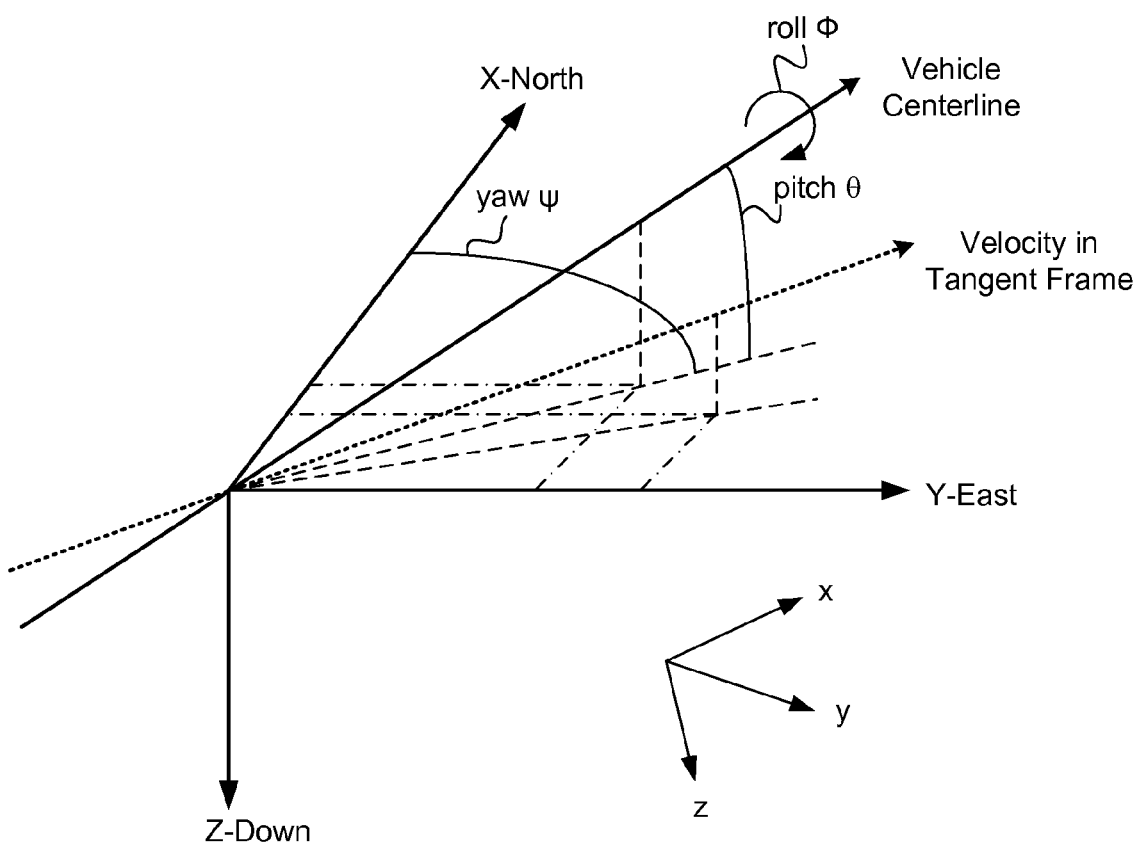
FIG. 3 is a graph illustrating coordinate axes associated with the computation of the navigation state of a vehicle, in accordance with one embodiment.

FIG. 3 is a graph illustrating coordinate axes associated with the computation of navigation state of the vehicle, in accordance with one embodiment. An absolute coordinate is indicated by three axes X, Y and Z, while a relative coordinate is indicated by three axes x, y and z. Positive X indicates north, positive Y indicates east, and positive Z indicates down in the direction of earth's gravity. The relative coordinate is defined for the moving frame of the vehicle. Taking the example of an aircraft, the body axis of the aircraft is defined as the coordinate frame with positive x through an aircraft nose, positive y through a right wing, and positive z down to complete the right-handed orientation of three axes. The origin of the three axes x, y, z is nominally located at the center of gravity (CG) of the vehicle.

A tangential frame is defined as a starting point for further rotation of the body of the vehicle due to changes in the navigation state of the vehicle. Pitch angle θ, yaw angle ψ and roll angle Φ are defined as illustrated in FIG. 3 with respect to the tangential frame.

Full State Navigation

Figure 4:
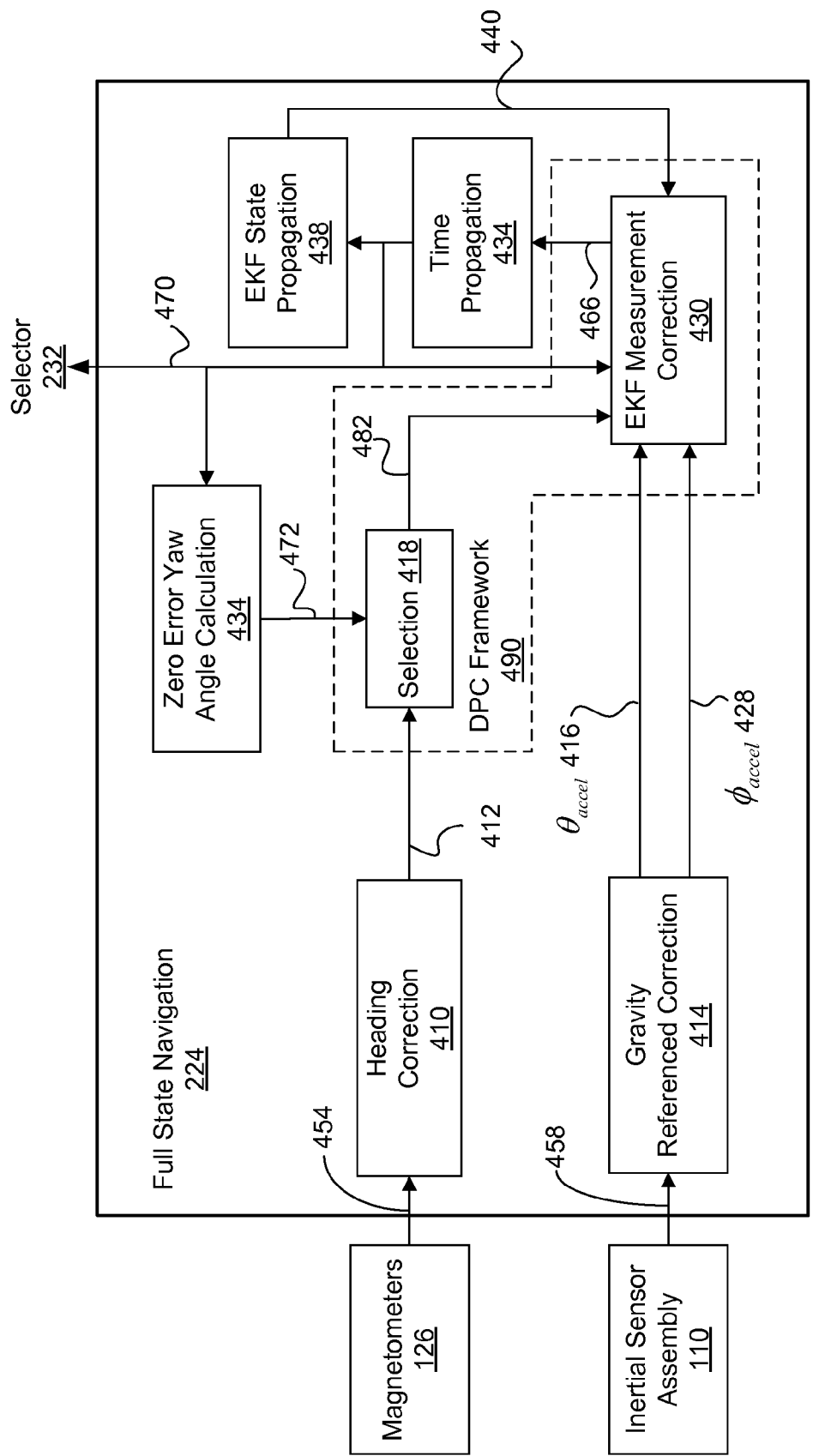
FIG. 4 is a block diagram illustrating a full state navigation module in accordance with one embodiment.

FIG. 4 is a block diagram illustrating a module implementing a full state navigation module 224 in accordance with one embodiment. The full state navigation module 224 includes, among other components, a heading correction module 410, a gravity referenced correction module 414, a zero error yaw angle calculation module 434, a selection module 418, an EKF state propagation module 438, a time propagation module 434, and an EKF measurement correction module 430. One or more of these components may be implemented in hardware, firmware, software or any combinations thereof.

Magnetometer signals 454 from the internal magnetometers 126 as converted by the A/D converter 164 are received at the heading correction module 410. The heading correction module 410 estimates the heading of the vehicle by processing the signals from the magnetometers 126 and outputs magnetometer heading information 412. The zero error yaw angle calculation module 434 receives time propagation information 470 (specifically, attitude quaternion Qbt) from the EKF time propagation module 434 and outputs a zero error yaw angle 472 defined such that y−Cx(t)=0 by converting Qbt to Euler angles. The selection module 418 selects either the heading information 412 or the zero error yaw angle 472 as an estimated yaw angle $\psi_{magGPS}$ 482 and provides it to the EKF measurement correction module 430. The selection module 418 and the EKF measurement correction module 430 form a part of the dynamic platform configuration (DPC) framework, as described below in detail with reference to FIG. 8.

The gravity referenced correction module 414 receives inertial sensor signals 458 from the inertial sensor assembly 110 as converted by the A/D converter 164. The gravity referenced correction module 114 then computes roll angle acceleration $\phi_{accel}$ 416 and pitch angle acceleration $\theta_{accel}$ 428. The computed roll angle acceleration $\phi_{accel}$ 416 and pitch angle acceleration $\theta_{accel}$ 428 are provided to the EKF measurement correction module 430.

In one embodiment, the time propagation module 434 implements a fast fixed-point reduced state model for propagating a normalized attitude quaternion and tangent frame velocities. Specifically, the time propagation module 434 performs time-propagation of the attitude quaternion as follows:

$$\dot{Qbt} = 0.5 \begin{bmatrix} 0 & -p & -q & -r \\ p & 0 & r & -q \\ q & -r & 0 & p \\ r & q & -p & 0 \end{bmatrix} \quad \text{Equation (1)}$$

where $$\begin{bmatrix} p \\ q \\ r \end{bmatrix}$$

is a bias corrected angular rate vector. The bias corrected angular rate vector equals the EKF rateBias state vector subtracted from the calibrated angular rate values computed, for example, by using routines described in Appendix. The EKF rateBias vector is an estimate of the angular rate sensor physical in-system bias used in the time integration equation (3). The time propagation module 434 also time-propagates the tangent velocities v Tan as follows:

$$v\text{Tan} = Cbt \cdot accelBody + \begin{bmatrix} 0 \\ 0 \\ g \end{bmatrix} \quad \text{Equation (2)}$$

where Cbt refers to the direction cosine matrix of the attitude quaternion Qbt and accelBody refers to a bias corrected acceleration vector. The accelBody equals the EKF accelBias vector subtracted from the calibrated accelerometer values. The calibrated accelerometer values are computed, for example, using routines described in Appendix. The time propagation module 434 outputs time propagation information 470 that indicates the attitude quaternion Qbt and the tangent velocities v Tan. The time propagation information 470 is fed to the zero error yaw angle calculation module 434, the EKF state propagation module 438, and the selector 232.

In one embodiment, the EKF state propagation module 438 receives the time propagation information 470 and performs zero-order time integration on a 13-state vector defined as follows:

$$\begin{bmatrix} v\text{Tan} \\ Qbt \\ rateBias \\ accelBias \end{bmatrix}_{t+1} = \begin{bmatrix} v\text{Tan} \\ Qbt \\ rateBias \\ accelBias \end{bmatrix}_t + \Delta t \cdot \begin{bmatrix} v\text{Tan} \\ \dot{Qbt} \\ 0 \\ 0 \end{bmatrix} \quad \text{Equation (3)}$$

where v Tan refers to tangential velocity of the vehicle, and $\Delta t$ refers to time step associated with the navigation update rate of the system. The EKF state propagation module 438 also normalizes the attitude quaternion Qbt by using the following equation:

$$Qbt(t+\Delta t) = Qbt(t)/|Qbt(t)| \quad \text{Equation (4)}$$

Additionally, the EKF state propagation module 438 updates a state covariance P using discrete-time form defined by the following equation:

$$P(t+\Delta t) = P(t) + \dot{P}\Delta t \quad \text{Equation (5)}$$

where $\dot{P} = AP(t) + P(t)A^T + Q$. Q is the system process noise and represents the covariance of an additive zero-mean white Gaussian random variable. A refers to state transition Jacobian computed according to the following equation:

$$A = \begin{bmatrix} 0 & 2Jq & 0 & -Cbt \\ 0 & 0.5\omega & 0.5Qb & 0 \\ & & 0 & \end{bmatrix} \quad \text{Equation (6)}$$

where $$Jq = \frac{\partial(v\text{Tan})}{2 \cdot \partial(Qbt)}$$

is a partial function $f(Qbt, accelBody)$, Cbt is a direction cosine matrix defined as $$-\frac{\partial(v\text{Tan})}{\partial(accelBias)},$$

0.5 $\omega$ is the attitude quaternion time propagation, and Qb is defined as $$\begin{bmatrix} q_1 & q_2 & q_3 \\ -q_0 & q_3 & -q_2 \\ -q_3 & -q_0 & q_1 \\ q_2 & -q_1 & -q_0 \end{bmatrix}.$$

Parameters $q_0$, $q_1$, $q_2$ and $q_3$ represent the elements of the attitude quaternion Qbt. The EKF state propagation module 438 provides computed state propagation information 440 to the EKF measurement correction module 430.

The EKF measurement correction module 430 generates a correction signal 466. The correction signal 466 includes, for example, a combination of GPS tangent frame velocity correction and magnetometer-based heading correction or GPS based track correction. Each correction vector y generated by the EKF measurement correction module 430 is defined in the context of a superset observation matrix $$C = \frac{\partial y}{\partial x}$$

that is used to update EKF observation. The EKF observation update is defined as $P(t+\Delta t) = P(t) - GCP(t)$ and $x(t+\Delta t) = x(t) + G \cdot (y - Cx(t))$, where $G = PC^T[CPC^T + R]^{-1}$. R is the observation noise and G is the Kalman gain matrix. The observation noise R may be adjusted based on the intensity of the vehicle dynamics. The correction vector y is included in the correction signal 576 and provided to the time propagation module 434.

The superset observation matrix is defined in the context y=Cx where $$y = \begin{bmatrix} velTanGPS \\ \phi_{accel} \\ \theta_{accel} \\ \psi_{magGPS} \end{bmatrix}.$$

As described above, $\phi_{accel}$ and $\theta_{accel}$ refer to is the roll angle acceleration and the pitch angle acceleration computed by the gravity referenced correction module 414, respectively. velTanGPS refers to tangential velocities determined from the GPS information 508. When the full state navigation is active, the correction vector y is reduced to $$\begin{bmatrix} \phi_{accel} \\ \theta_{accel} \\ \psi_{magGPS} \end{bmatrix}.$$

The superset observation matrix is defined by the following equation:

$$C = \begin{bmatrix} I & 0 \\ 0 & \partial\theta/\partial Qbt \\ 0 & \partial\phi/\partial Qbt & 0 \\ 0 & \partial\psi/\partial Qbt \end{bmatrix} \quad \text{Equation (7)}$$

where $$\partial\theta/\partial Qbt = \begin{bmatrix} \frac{2q_1 a}{a^2+b^2} & \frac{2q_0 a + 4q_1 b}{a^2+b^2} & \frac{2q_3 a + 4q_2 b}{a^2+b^2} & \frac{2q_2 a}{a^2+b^2} \end{bmatrix} \quad \text{Equation (8)}$$

$$\partial\phi/\partial Qbt = \begin{bmatrix} \frac{2q_2}{\sqrt{1-u^2}} & \frac{-2q_3}{\sqrt{1-u^2}} & \frac{2q_0}{\sqrt{1-u^2}} & \frac{-2q_1}{\sqrt{1-u^2}} \end{bmatrix} \quad \text{Equation (9)}$$

$$\partial\psi/\partial Qbt = \begin{bmatrix} \frac{2q_3 c}{c^2+d^2} & \frac{2q_2 c}{c^2+d^2} & \frac{2q_1 c + 4q_2 d}{c^2+d^2} & \frac{2q_0 c + 4q_3 d}{c^2+d^2} \end{bmatrix} \quad \text{Equation (10)}$$

Here, $\phi=\tan^{-1}(b/a)$, $\theta=-\sin^{-1}(u)$, and $\psi=\tan^{-1}(d/c)$ are the Euler angle representations of the attitude quaternion $$Qbt = \begin{bmatrix} q_0 \\ q_1 \\ q_2 \\ q_3 \end{bmatrix}$$

derived from the direction cosine matrix Cbt. a, b, c, d, and u represent intermediate calculations defined as $a=1-2(q_1^2+q_2^2)$, $b=2(q_2 q_3 + q_0 q_1)$, $c=1-2(q_2^2+q_3^2)$, $d=2(q_1 q_2 + q_0 q_3)$, and $u=2(q_1 q_3 - q_0 q_2)$. In one embodiment, these equations are implemented using fixed-point digital signal processing (DSP) computations scaled with decimal bits to maintain accuracy while maximizing computational efficiency.

The computed state propagation information 440 is then provided to the EKF measurement correction module 430 to compute the time propagation information 470 for the next time step by the time propagation module 434. The process of computing the correction signal 466 and the time propagation information 470 is repeated for the next time step.

Reduced State Navigation

Figure 5:
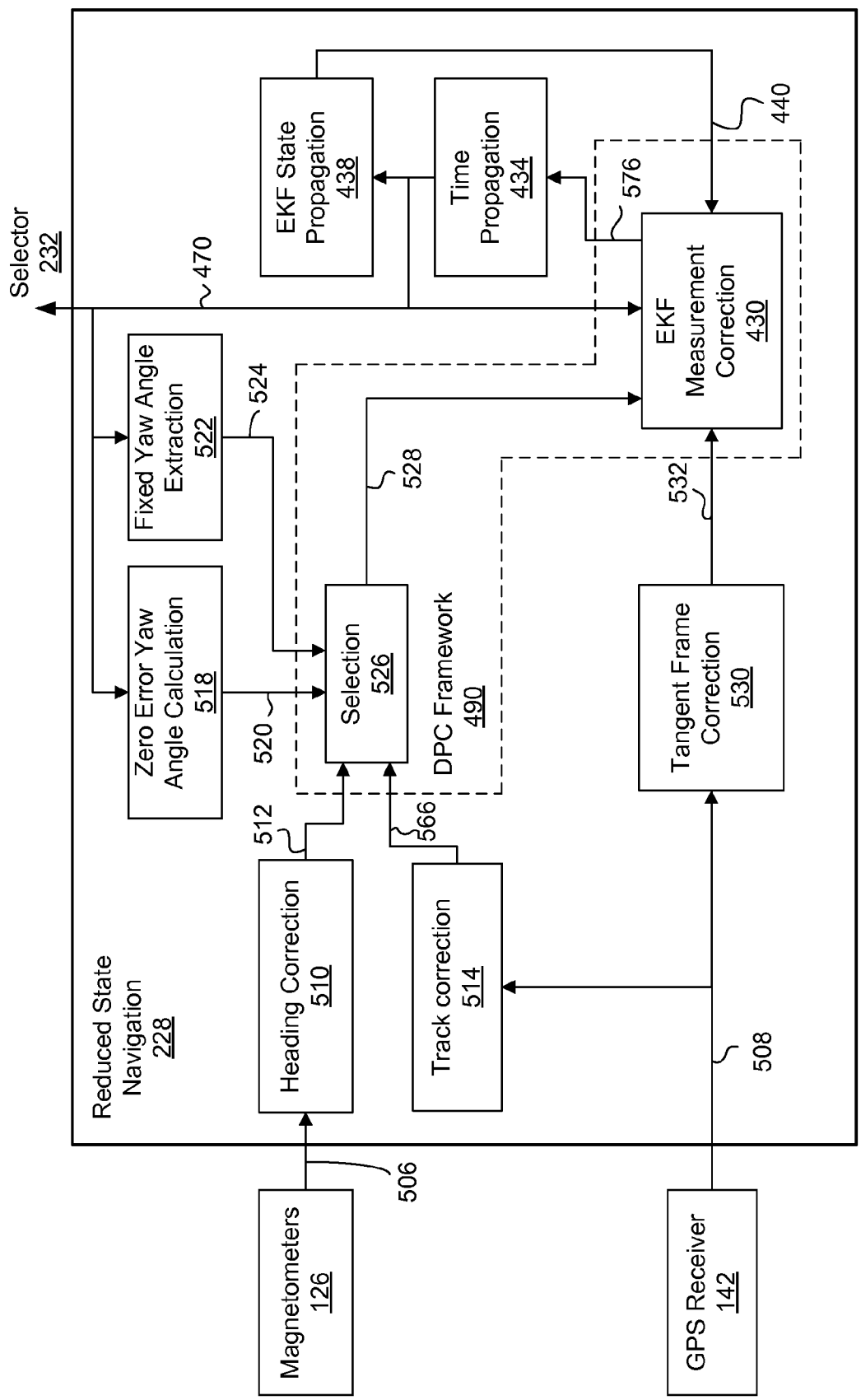
FIG. 5 is a block diagram illustrating a reduced state navigation module in accordance with one embodiment.

FIG. 5 is a block diagram of the reduced state navigation module 228 in accordance with one embodiment. The reduced state navigation module 228 uses a different combination of sensor inputs compared to the full state navigation module 224. Specifically, the reduced state navigation module 228 uses the sensor signal 506 from the internal magnetometers 126 and the GPS information 508 from the GPS receiver 142. The GPS information 508 indicates the location, speed, and direction of the vehicle based on the GPS signals received from a constellation of orbiting satellites.

The reduced state navigation module 228 includes, among other components, a heading correction module 510, a track correction module 514, a zero error yaw angle calculation module 518, a fixed yaw angle extraction module 522, a selection module 526, an EKF state propagation module 538, a time propagation module 534, an EKF measurement correction module 534, and a tangent frame correction module 530. One or more of these components may be implemented in hardware, firmware, software or any combinations thereof.

The heading correction module 510 and the zero error yaw angle calculation module 518 of the reduced state navigation module 228 are essentially the same as the heading correction module 410 and the zero error yaw angle calculation module 434 of the full state navigation module 224. Accordingly, descriptions about the heading correction module 510 and the zero error yaw angle calculation module 518 are omitted herein for the sake of brevity. The heading correction module 510 generates and sends magnetometer heading information 512 to the selection module 526.

The track correction module 514 receives the GPS information 508 from the GPS receiver 142 to generate a GPS yaw angle $\psi_{GPS}$ 566. The GPS yaw angle $\psi_{GPS}$ 566 is fed to the selection module 526. The GPS yaw angle $\psi_{GPS}$ 566 generated by the track correction module 514 may be optimized for pointing behavior by removing the angular difference between a vehicle velocity track and the heading of the vehicle. The headingTrackOffset parameter specifies the angular difference between the vehicle velocity track and the heading of the vehicle using the following equation:

$$\psi_{magGPS} = \text{arctan 2}(velTanGPS_2, velTanGPS_1) - \text{magVar} - \text{headingTrackOffset} \quad \text{Equation (7)}$$

where arctan 2 is the typical quadrant-corrected inverse tangent function, and magVar is the magnetic variance at the current location. The magnetic variance magVar is derived from World Magnetic Model (WMM) available from the United States National Geospatial-Intelligence Agency. When no magnetometer yaw angle measurement is available, the GPS yaw angle $\psi_{GPS}$ 566 may be used to improve the performance of the navigation system by creating an alternative EKF measurement for the estimated yaw angle $\psi_{magGPS}$ 528. The GPS yaw angle $\psi_{GPS}$ 566 is especially useful for application on land vehicles with articulating structures such as the turret on a tank where the navigation system 100 is placed on an articulating structure and motions of such structure must be compensated independently.

The estimated yaw angle $\psi_{magGPS}$ 528 may be selected from one of the following four inputs to the selection module 526: (i) the GPS yaw angle $\psi_{GPS}$ 566 extracted from the GPS information 508, (ii) the magnetometer heading information 512 estimated from the magnetometers signals 506, (iii) zero error yaw angle 520 computed by the zero error yaw angle calculation module 518, and (iv) a fixed yaw angle 524 extracted by the fixed yaw angle extraction module 522. The selection module 526 selects one of these inputs as the estimated yaw angle $\psi_{magGPS}$ 528 and provides it to the EKF measurement correction module 430 for computation of the correction signal 576. The selection of the input signals as the estimated yaw angle $\psi_{magGPS}$ 528 is described below in detail with reference to FIGS. 7A and 7B.

The tangent frame correction module 530 also receives the GPS information 508 from the GPS receiver 142 to compute tangential velocities velTanGPS 532. The computed tangential velocities velTanGPS 532 are provided to the EKF measurement correction module 450 for computation of the correction signal 576.

The EKF measurement correction module 430, the time propagation module 434 and the EKF state propagation module 438 of the reduced state navigation module 228 are essentially the same as the counterpart modules in the full state navigation module 224 of FIG. 4 except that correction vector y included in correction signal 576 is reduced to $$\begin{bmatrix} vel\text{Tan}GPS \\ \psi_{magGPS} \end{bmatrix},$$

where velTanGPS refers to tangential velocities determined from the GPS information 508 and $\psi_{magGPS}$ refers to an estimated yaw angle or heading of the vehicle. The EKF measurement correction module 430, the time propagation module 434 and the EKF state propagation module 438 are explained above with reference to FIG. 4, and description for these modules is omitted herein.

The zero error yaw angle calculation module 518 and the fixed yaw angle extraction module 522 receives the attitude quaternion Qbt included in the time propagation information 470. The zero error yaw angle calculation 518 computes zero error yaw angle 520 by converting Qbt to Euler angles. The fixed yaw angle extraction module 522 extracts a fixed yaw angle 524 from the attitude quaternion Qbt. The fixed yaw angle 524 is a constant representing the stationary pointing of the vehicle at the time it comes to a stop. As described above, the zero error yaw angle 520 and the fixed yaw angle 524 are fed to the selection module 526 together with the magnetometer heading information 512 and the GPS yaw angle $\psi_{GPS}$ 566.

The EKF measurement correction module 430, the time propagation module 434, and the EKF state propagation module 438 of the reduced state navigation module 228 perform computation that estimates the navigation state of the vehicle using an Extended Kalman Filter (EKF). The EKF of the reduced state navigation 228 provides an advantage in computational efficiency over typical full-state navigation due to the reduction in state space and coordinate frame transformations required. Furthermore, when coupled with the dynamic platform configuration and navigation mode switching, the computation according to this embodiment estimates the navigation state more accurately compared to conventional methods.

Navigation Mode Switching

The navigation mode switching allows navigation algorithms to seamlessly adapt to the availability and quality of sensor inputs. By adapting to the availability and quality of the measurement sources, valid or uncorrupted sensor inputs is relied upon heavily while invalid or corrupted measurement sensor inputs are discarded or minimally used. In the presence of unpredictable measurement data, the navigation mode switching increases the benefit gained from available sensor inputs while maintaining the integrity of the navigation algorithms and avoiding corruption of the navigation data.

Figure 6A:
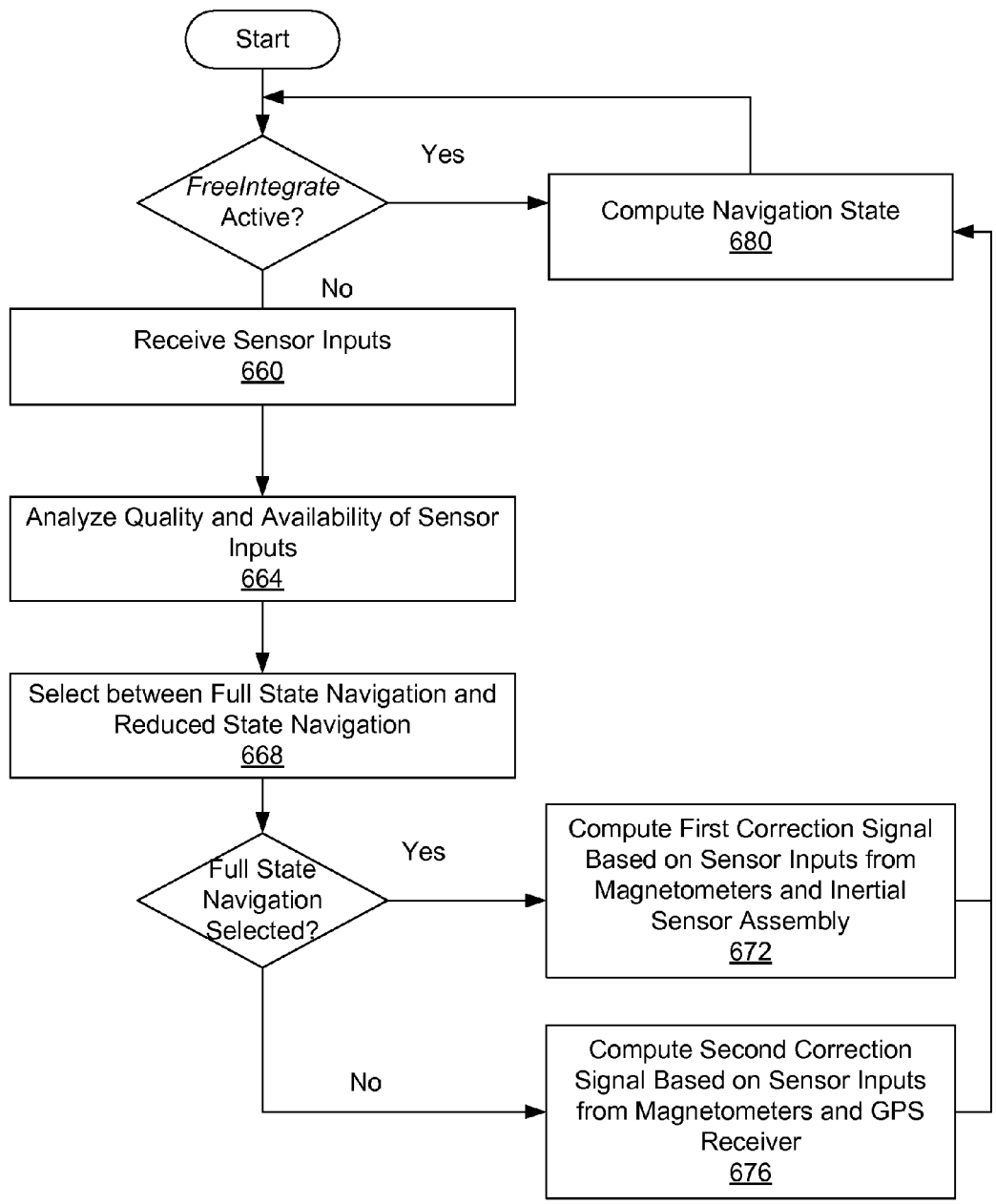
FIG. 6A is a flow chart illustrating a method of selecting a navigation mode, according to one embodiment.

FIG. 6A is a flow chart illustrating a method of selecting a navigation mode, in accordance with one embodiment. First, it is determined whether freeIntegrate signal is active or not. If the freeIntegrate signal is active, then the sensor inputs are disregarded and the navigation state is computed 660 based only on the state and time propagation of the EKF.

If the freeIntegrate signal is not active, sensor inputs from various sensors are received at the navigation system 100. The quality and availability of the sensor inputs are analyzed 664 at the measurement source health detection module 210. Based on the quality and availability, either the full state navigation or the reduced state navigation is selected 668. If the full state navigation is selected, then a first correction signal is computed 672 at the EKF measurement correction module 430 based on the sensor inputs from the internal magnetometers 126 and the inertial sensor assembly 110. If the reduced state navigation is selected, then a second correction signal is computed 676 at the EKF measurement correction module 430. The first or second correction signal is then provided to the time propagation module 434 to compute 680 the navigation state of the vehicle. The process then returns to the step of determining whether the freeIntegrate signal is active.

The navigation mode switching module 218 chooses a navigation algorithm to enhance process-covariance and robustness of state initialization by minimizing numerical disturbances in EKF. Specifically, the navigation mode switching module 218 decides whether to use the full state navigation module 224 or the reduced navigation module 228 based on a process that implements the state transition diagrams of FIGS. 6B to 7B.

Figure 6B:
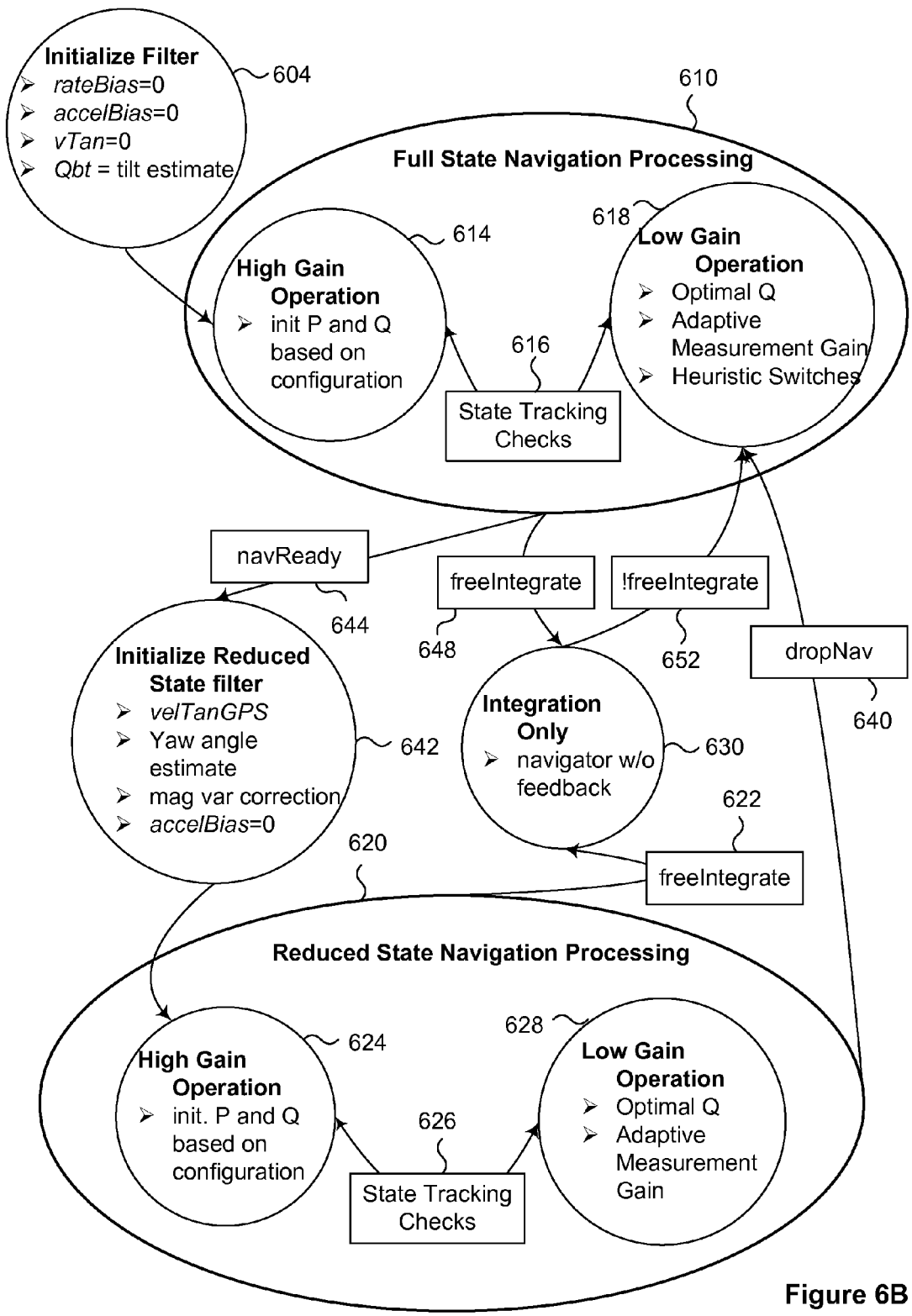
FIG. 6B is a state transition diagram illustrating switching of navigation modes in accordance with one embodiment.

FIG. 6B is a state transition diagram illustrating switching of navigation modes, in accordance with one embodiment. First, at block 604, the EKF filter is initialized. Specifically, the EKF rateBias state vector, the EKF accelBias vector, and the tangent velocities vTan are initialized to zero at block 604. The attitude quaternion Qbt is initialized to a tilt estimate generated based on the sensor signals 458 from the inertial sensor assembly 110. After the initialization, a transition is made to the full state navigation processing 610. Specifically, the state transitions to high gain operation 614 where the state covariance P and the system noise Q are initialized based on the configuration set by the DPC platform. While the reliability of sensor inputs is uncertain, the high gain operation 614 is performed where larger than nominal state covariance P value and the system noise Q value are used to ensure numerical stability and robust operation.

The EFK filter may also be initialized 604 when over-range events are detected. Vehicle behaviors or events exceeding a measuring range of the inertial sensor assembly 110 may have a significant effect on the accuracy of the navigation system 100. The behaviors or events causing deviation from the measuring range include highly dynamic events such as a rapid turn, or high-g maneuver that saturates any inertial sensors. Such behaviors or events may be detected by low-pass filtering of the sensor inputs received from the inertial sensor assembly 110 and checking if the filtered signal exceeds a threshold. A parameter is introduced to determine system behavior following an over-range trigger. If the behavior or event is a mildly over-range (e.g., launching operation), then normal EKF operation is continued through the event. If, however, an unexpected and extreme over-range event occurs, then the navigation system return reinitializes 604 the EFK filter to prevent continued corruption of the navigation outputs due to the over-range event.

State tracking checks 616 on maximum covariance P values to ensure that the transition to a low gain operation 618 maintains smooth system state propagation. Specifically, the state covariance P thresholds from EKF state propagation module 438 and Kalman gain G thresholds from EKF measurement correction module 430 are used as state tracking checks. The state covariance P and Kalman gain G are computed during EKF propagation.

The navigation mode switching module 218 guards transition from the full state processing 610 to the reduced state processing 620 by navReady signal 644. The navReady signal 644 ensures that the EKF measurements needed for the reduced state processing are available and reliable. The navReady signal 644 is defined as follows:

$$\text{navReady}=\text{haveGPSvel} \text{ \& } \text{haveYawMeasurement} \quad \text{Equation (8)}$$

where haveGPSvel signal indicates whether GPS velocities are available, and haveYawMeasurement signal indicates whether yaw angle measurement is available. The haveGPSvel signal and haveYawMeasurement signal are defined as follows:

$$\text{haveGPSvel}=\text{useGPS} \text{ \& } (\text{validGPSIntvelAid}|$$
$$(\text{validGPSExtvelAid} \text{ \& } \text{allowExtGPS})) \quad \text{Equation (9)}$$

$$\text{haveYawMeasurement}=(\text{mags} \text{ \& } \text{useMags})$$
$$|\text{validMagAid}|\text{validYawAid}|(\text{haveGPSvel} \text{ \& }$$
$$\text{speed}>1.0\text{m/s}) \quad \text{Equation (10)}$$

where useGPS signal indicates whether GPS information 508 should be used for navigation, mags signal indicates that the system has magnetometer sensors, validGPSIntvelAid signal indicates that the system contains an internal GPS and is receiving valid GPS data, validGPSExtvelAid signal indicates that the system is receiving valid GPS data from an external source, allowExtGPS signal indicates that the user will accept an external GPS source, useMags signal indicates that the user will accept internal magnetometer data, validMagAid signal indicates that the system is receiving a valid external magnetometer source, validYawAid signal indicates that the system is receiving a valid external yaw measurement, speed indicates the speed determined from the GPS information 508. The validGPSIntvelAid and validGPSExtvelAid signals are determined by the reliability of an internal GPS receiver and the reliability of the external GPS receiver, respectively.

In one embodiment, the reliability of GPS information 508 is evaluated using correlation information of the space vehicle measurements generated at the GPS receiver 142. The correlation information indicates the accuracy of its navigation outputs such as velocity and position error estimates, geometric dilution of precision, least-squares fit residuals, satellite correlator tracking locks and binning distributions. Thresholds, peak detectors, and smoothing filters evaluate this information and set the validGPSIntvelAid and validGPSExtvelAid signals.

The validMagAid signal is generated based on the reliability of the sensor signal 454 from the magnetometer. Similarly, the validYawAid signal is generated based on the reliability of a sensor signal from an external heading sensor (not shown). The reliability of these sensor signals may be evaluated using, for example, electrical measurements of voltage, current, inductance, continuity of the magnetic sensing element, and comparison of the magnetometer measurements to a twelfth-order spherical-harmonic WMM. A difference threshold between the magnetometer measurements and the predicted measurements of the WMM sets the validMagAid and validYawAid signals.

The process described above allows the navigation algorithms to seamlessly adapt to the availability and quality of measurement sources as well as configuration according to the DPC platform for improved performance based on vehicle and application specific characteristics. When the navReady signal 644 is qualified, the reduced state filter is initialized 642. Specifically, the tangential velocities velTanGPS from GPS information, yaw angle estimate (heading estimate) $\psi_{magGPS}$, and mag var correction are initialized by a time averaging magGPS of measurements from the GPS source. After the reduced state filter is initialized 642, the process transitions to a high gain operation 624 of the reduced state processing 620. As with the full state navigation mode, state tracking checks 626 ensure smooth transitions between the high-gain reduced state processing 624 and the low-gain reduced state processing 628. The navigation mode switching module 218 guards transition back to the full state navigation mode processing based on dropNav signal 640 which is defined as follows:

$$\text{dropNav}=!\text{haveGPSvel}|(!\text{haveYawMeasurement} \text{ \& }$$
$$!\text{stationaryLockDownYaw}) \quad \text{Equation (10)}$$

where stationaryLockDownYaw signal indicates whether fixed yaw angle 524 or zero error yaw angle 520 should be used under specific circumstances. Based on the platform dynamics and vehicle behavior, StationaryLockDownYaw signal allows the navigation system to track pivoting maneuvers by using the zero error yaw angle 520 when tangential velocities are near zero or uses a fixed yaw angle 524 to minimize yaw angle drift by assuming that the vehicle points toward a fixed stationary target. In both cases, the zero error yaw angle 520 and the fixed yaw angle 524 are derived from the time propagation information 470.

In both the full state navigation processing 610 and the reduced state navigation processing 620, all EKF correction signals 466, 576 may be turned off, which effectively leaves the EKF state propagation module 438 to create navigation outputs. Specifically, the freeintegrate signals 622, 648 turns off the EKF correction signal 466, 576 thereby allowing the EKF inertial navigation to be performed without any correction signals, as described below in detail with reference to FIG. 8.

Figure 7A:
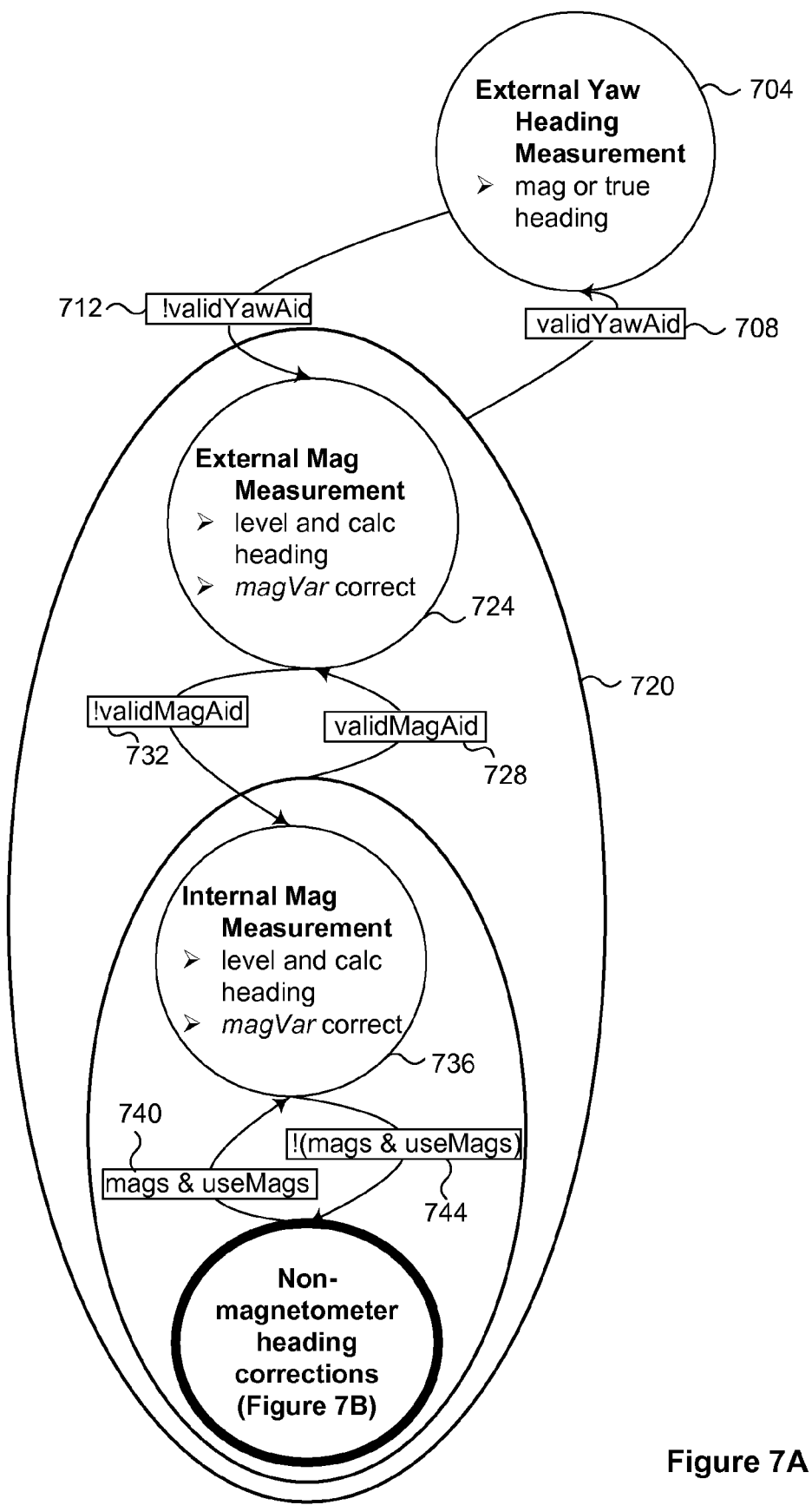
FIG. 7A is a state transition diagram illustrating yaw measurement switching using magnetometer correction, in accordance with one embodiment.

FIGS. 7A and 7A are state transition diagrams illustrating a process of selecting yaw angle measurement in accordance with one embodiment. The selection modules 418, 526 selects yaw angle measurements from sources including, among others, an external magnetometer (not shown), the internal magnetometer 126, the GPS information 508, the zero error yaw angle 520, and the fixed yaw angle 524. The selected yaw measurements are used for determining the estimated yaw angle $\psi_{magGPS}$ for both the full state navigation and the reduced state navigation. Specifically, the selection modules 418, 516 decides which measurements to use based on validYawAid signal 708, validMagAid 728, mags and useMags 740, haveGPSvel 780, and stationaryLockDownYaw 784. These signals are generated based on the health data 210, the control data 216 and the measurement data 242 data stored in the measurement statistics 250.

The validYawAid signal 708 indicates that a yaw heading measurement is available from the external heading sensor (not shown). When the validYawAid signal 708 is active, the yaw angle measurement from the external heading sensor is used. If the validYawAid signal is inactive (i.e., !validYawAid signal 712 is active), a yaw angle correction process 720 is performed using signals from the external magnetometers (not shown), the internal magnetometers 126, the GPS receiver 142, and the time propagation module 434.

Figure 7B:
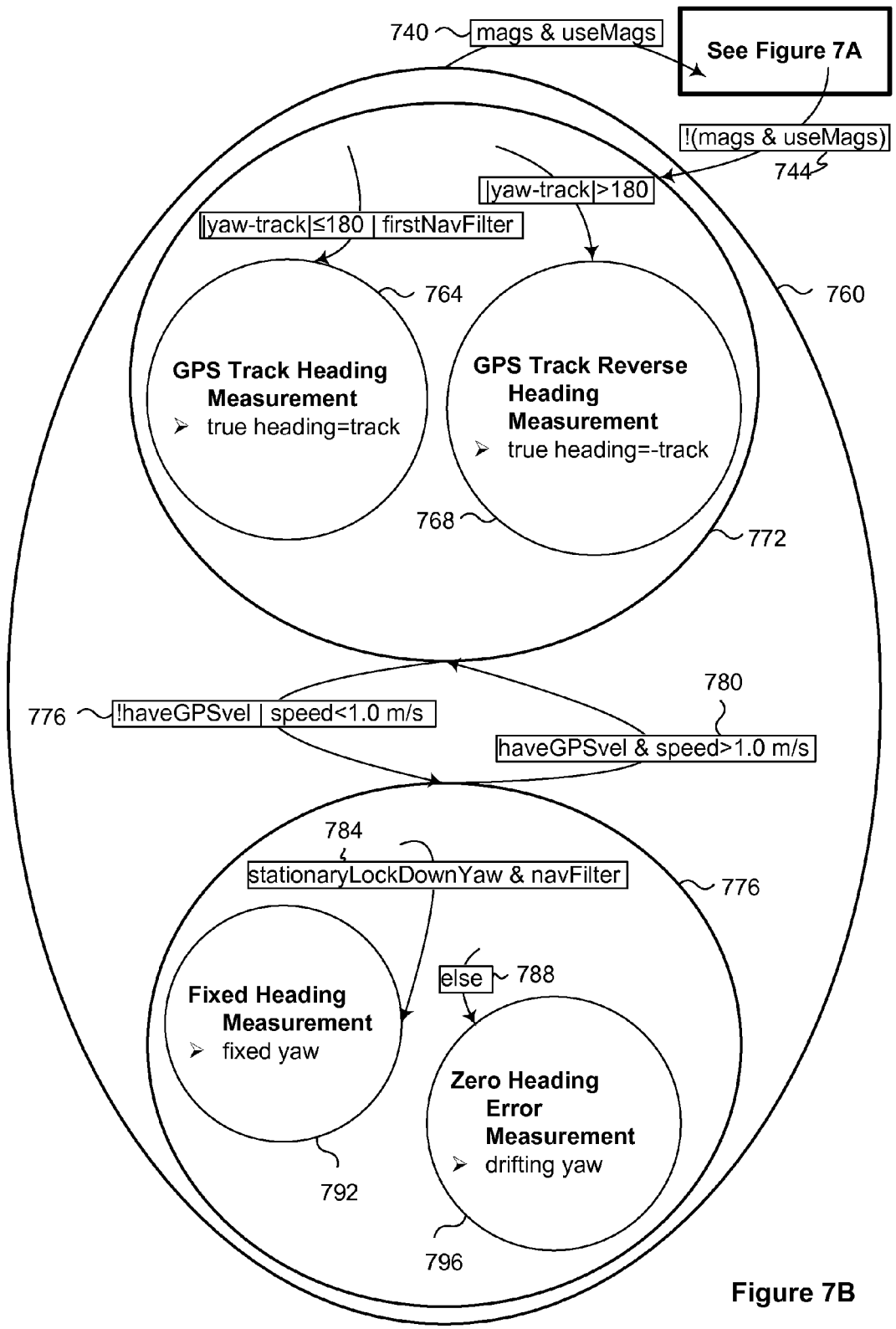
FIG. 7B is a state transition diagram illustrating yaw measurement switching without magnetometer correction, in accordance with one embodiment.

Specifically, if the validMagAid signal 728 is active, the measurements received from the external magnetometers are used 724 to obtain the yaw angle estimate $\psi_{magGPS}$. This estimate requires rotation of the magnetometer measurements to the tangent plane, known as leveling, and correction for the difference between true north and magnetic north, known as magnetic variance. When the validMagAid signal 728 is inactive (i.e., !validMagAid signal 732 is active) but the mags and useMags signals 740 are active, measurements from the internal magnetometers 126 are used as indicated by block 736. If the (mags and useMags) signal 740 is inactive (i.e., !(mags and useMags) signal 744 is active), non-magnetometer heading corrections 760 are performed as illustrated in FIG. 7B.

For non-magnetometer heading corrections 760, |yaw-track| signal and speed signal may be used. |yaw-track| signal represents the vehicle drift angle and may be calculated from the sensor signal from the GPS yaw angle $\psi_{GPS}$ 566 and the magnetometer heading information 512. The speed signal represents the magnitude of the GPS velocity. Specifically, if the |yaw-track| is not over a predetermined value (e.g., 180) or the EKF navigation filter is first initialized (indicated by firstNavFilter signal), the yaw angle (heading) is set as the track value $\psi_{GPS}$ 566 in obtained from the GPS information 508. On the other hand, if the |yaw-track| is over the predetermined value, the yaw angle (heading) is set as inverse of the track value to account for reverse vehicle motion. If !haveGPSvel signal is active or the speed is less than a predetermined threshold (e.g., 1.0 m/s), the yaw angle derived from the time propagation information 470 (specifically, the attitude quaternion Qbt) is used. Specifically, if the stationalryLockDownYaw signal and navFilter signal are active 784, the fixed yaw angle 524 obtained from the fixed yaw angle extraction module 522 is selected as the estimated yaw angle $\psi_{magGPS}$ 528 as indicated by block 792. If the stationalryLockDownYaw signal or the navFilter signal is inactive 788, the zero error yaw angle 520 is selected as the estimated yaw angle $\psi_{magGPS}$ 528 as indicated by block 796.

Parameters and signals described above with reference to FIGS. 6B through 7B may be set by the user according to the characteristics or dynamics of the vehicle. To facilitate setting of such parameters and signals, the DPC framework may be used as described below in detail with reference to FIG. 8.

Dynamic Platform Configuration Framework

In one or more embodiments, the dynamic platform configuration (DPC) framework allows the navigation system 100 to be configured according to vehicle characteristics or dynamics of the vehicle. Specifically, the DPC framework allows the navigation algorithms to be customized to specific vehicle characteristics or dynamics using heuristic signal processing techniques and gain-scheduling algorithms. The DPC framework also parameterizes navigation algorithm settings including, among others, inertial sensor low-pass filter bandwidth, packet output data, packet output rate, system orientation, static yaw tracking behavior, vehicle track pointing offset, magnetometer environmental bias and scale factor, static and dynamic activity, inertial sensor over-range behavior, turn switch threshold, and selection regarding the use of certain sensors (e.g., the GPS receiver 142, the magnetometers 126, and the inertial sensor assembly 110).

In one embodiment, the DPC framework also sets parameters associated with the sensing hardware such as software-adjustable low-pass filters with adjustable bandwidth. The bandwidth of the low-pass filter can be adjusted by user inputs received via the serial data I/O 150. In this way, the sensor response may be modified according to the vehicle and application characteristics. Further, the refresh rate of sensor inputs received from a certain sensor and the rate at which the navigation data is updated may also be adjusted. Collectively, these parameterized settings adjust sensitivity of the navigation system 100 towards the sensor signals.

In one embodiment, parameters for biasing and scaling magnetometer may be employed to capture the minimum and maximum magnetometer measurements using a complete heading rotation of the vehicle. The calculated magnetometer parameters are used to correct the tangent plane magnetometer vector before calculating the estimated yaw angle. In this way, magnetometer field measurement anomalies near the vehicle may be corrected and the use of corrupted magnetometer measurements may be prevented.

In one embodiment, parameter 1 for static and dynamic activity may be employed to optimize EKF measurement gains based on the intensity of dynamics that the vehicle is subject to. As accelerations increase, the EKF gravity referenced measurements from the inertial sensor assembly 110 may become corrupt. This parameter may allow optimal use of measurements by increasing the observation noise R. For example, the observation noise R may be increased by cI where c is an identity matrix scalar activity constant. In this way, the effect of state feedback on the navigation computation is reduced when measurements are likely to be corrupt.

Figure 8:
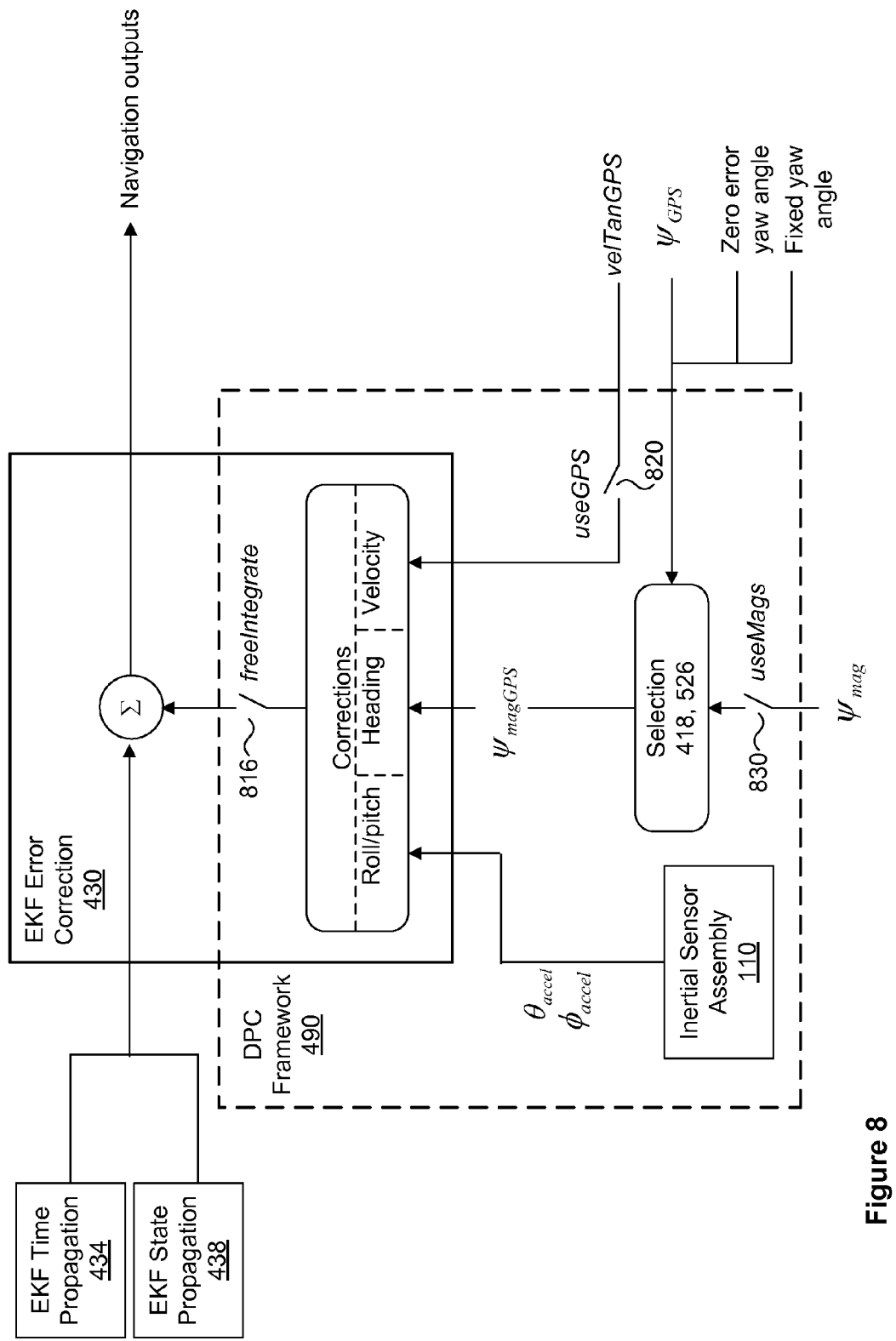
FIG. 8 is a schematic diagram illustrating dynamic configuration and parameterization of a navigation system, in accordance with one embodiment.

FIG. 8 is a schematic diagram illustrating dynamic configuration and parameterization of a navigation system, in accordance with one embodiment. Referring to FIGS. 4 and 5, the DPC framework 490 includes, among other components, the selection modules 418, 526, a correction switch 816 for enabling or disabling any correction signal, a GPS switch 820 for enabling or disabling the velTanGPS 532 received from the tangent frame correction module 530, and a magnetometer signal switch 830 for enabling or disabling the magnetometer heading information $\psi_{mag}$ received from the heading correction modules 410, 510. These switches may be operated manually by a user or automatically by a computer-implemented process. The selection modules 418, 526 selects one of the magnetometer heading information, the GPS yaw angle, the zero error yaw angle and the fixed yaw angles as the estimated yaw angle $\psi_{magGPS}$ and sends the estimated yaw angle $\psi_{magGPS}$ to the EKF error correction module 430.

Referring back to FIG. 8, a correction switch 816 enables or disables corrections signals from the sensors based on the freeIntegrate signal. When the correction switch 816 is turned off, all EKF corrections are removed from the navigation algorithms, effectively leaving pure inertial navigation state propagation to create navigation outputs. The magnetometer heading information $\psi_{mag}$ may be excluded from selection based on the useMags signal received at the magnetometer signal switch 830. The useGPS signal may operate the GPS switch 820 to enable or disable velocity correction using tangential velocities velTanGPS 532.

Figure 9B:
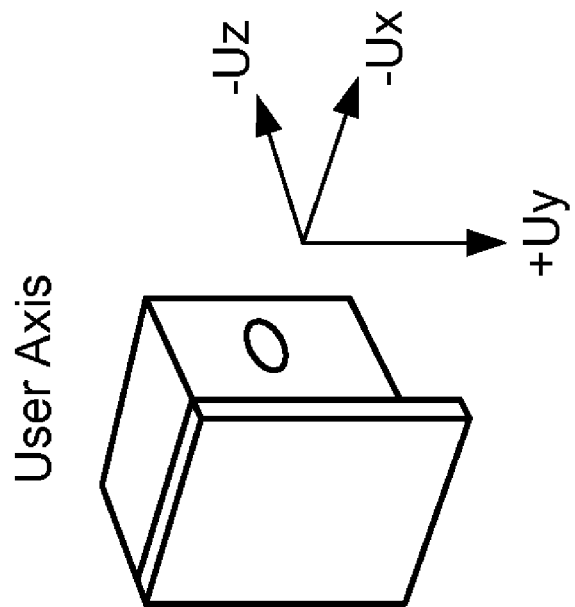
FIGS. 9A and 9B are diagrams illustrating configuration of reference coordinate axes of a sensor, in accordance with one embodiment.
Figure 9A:
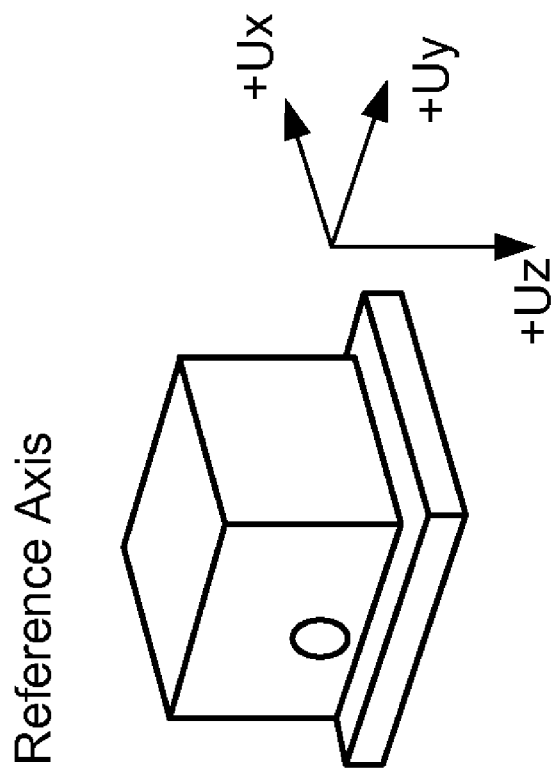

The DPC framework 490 may also adjust parameters of one or more sensors. Referring to FIGS. 9A and 9B, configuration of references axes of a sensor in accordance with one embodiment is displayed. Specifically, the reference axis of the inertial sensor assembly 110 may be adjusted and defined by a user to satisfy specific requirements of the vehicle. The reference axis set [Ux, Uy, Uz] is defined by a hardware structure of the inertial sensor assembly 110. The user axis set [X, Y, Z] may be established by mapping these axes to the reference axis set [Ux, Uy, Uz] by the DPC framework 490. In this way, inertial sensor assemblies with different axis coordinates may be used in the navigation system with the DPC framework 490. Other parameters of the inertial sensor assembly 110 may also be adjusted. Further, parameters associated with other sensors may also be adjusted by the DPC framework 490.

Figure 10:
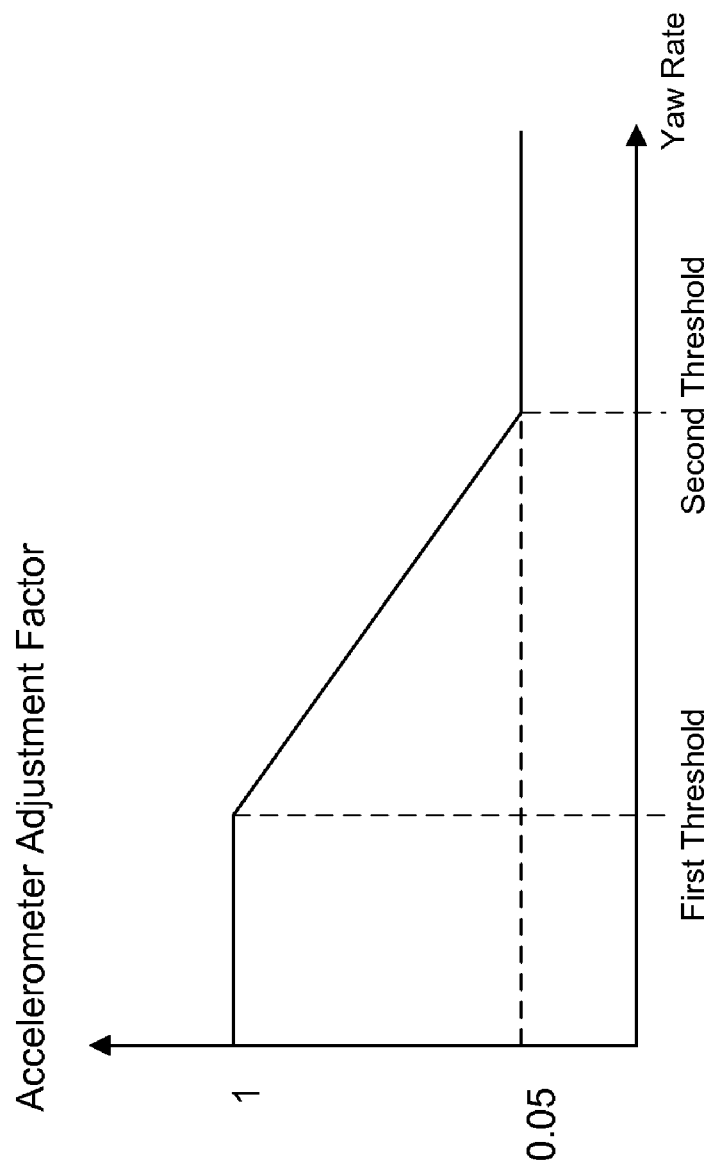
FIG. 10 is a graph illustrating an accelerometer adjustment factor with respect to yaw rate, in accordance with one embodiment.

In one or more embodiments, the navigation system 100 dynamically adjusts reliance on the EKF error correction generated from the sensor signals. For example, the navigation system 100 may employ an accelerometer adjustment factor indicative of confidence in the acceleration of vehicle determined from the inertial sensor assembly 110. FIG. 10 is a graph illustrating an accelerometer adjustment factor with respect to yaw rate, in accordance with one embodiment. The yaw rate refers to the rate at which the yaw angle changes. The accelerometer adjustment factor takes a high value at a lower yaw rate whereas the accelerometer adjustment factor takes a low value at a higher yaw rate.

The DFC framework 490 may also be used to set thresholds or parameters associated with the accelerometer adjustment factor. Such thresholds or parameters may be set according to the vehicle characteristics to more accurately estimate the navigation state. For example, a user may set the accelerometer adjustment factor to a factor of one (1) when the yaw rate is between 0 and a first threshold. Navigation errors from coordinated-turn maneuvers typically performed by fixed-wing airborne vehicles can be significantly reduced by optimal setting the first threshold. In one embodiment, the first threshold is set above 0.4 degree/second. As the yaw rate increases beyond the first threshold, the accelerometer adjustment factor gradually decreases to 0.05 at a second threshold. The acceleration vector determined from the inertial sensor assembly 110 gradually diverges from the gravity vector as the yaw rate increases for aircraft under a coordinated turn assumption. The accelerometer adjustment factor is maintained at 0.05 at a yaw rate higher than the second threshold. The graph illustrated in FIG. 10 is merely illustrative and the accelerometer adjustment factor may be represented by various other forms of lines or equations.

In one embodiment, the accelerometer adjustment factor is computed at the EKF measurement correction module 430. The EKF measurement correction module 430 then computes the correction signal 576 based on the accelerometer adjustment factor. Specifically, the EKF measurement correction module 430 assumes that the navigation state determined from the inertial sensor assembly 110 is more likely to be accurate when the yaw rate is low. As the yaw rate increases, the EKF measurement correction module 430 relies less heavily on the acceleration signals 416, 428 based on the inertial sensor assembly 110 and therefore, generates a smaller correction signal 466.

In one embodiment, multiples sets of predetermined parameters are stored in the navigation system 100. A set of predetermined parameters may be selected based on the user inputs. For example, the navigation system 100 may store predetermined parameter setting 1, predetermined parameter setting 2 and predetermined parameter setting 3. The user may conveniently choose a set of parameter setting. In this way, the user need not set each parameter individually but choose a predetermined set of parameters.

Example Operation of Navigation System

Figure 11:
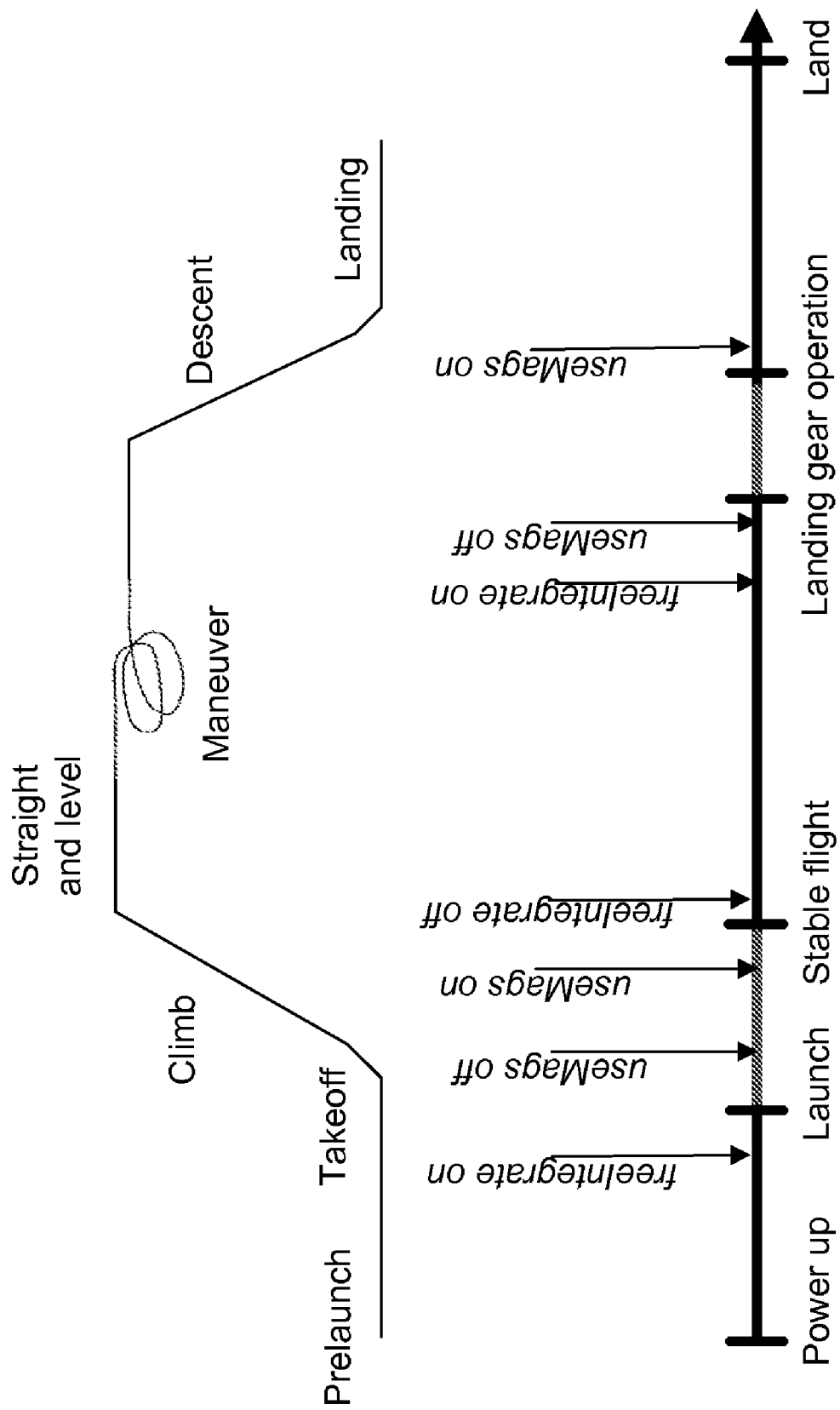
FIG. 11 is a diagram illustrating operation of a navigation system at different states of flight, in accordance with one embodiment.

FIG. 11 is a diagram illustrating operation of a navigation system at different states of flight, in accordance with one embodiment. In a prelaunch mode after power up and before takeoff, the freeIntegrate signal is turned on to prepare for abrupt changes in heading and altitude. That is, the navigation system takes into account signals from various sensors to correct the inertial navigation state as determined by the EKF time propagation module 434 and the EKF state propagation module 438. After the vehicle becomes stable after the takeoff, the freeIntegrate signal is turned off.

Landing gear operations may cause magnetic interferences on the internal or external magnetometers. The useMags signal is turned off before operating the landing gears (e.g., unfolding or retracting) to avoid the magnetometer signals from corrupting the navigation state information. In the example of FIG. 11, the useMags signal is turned off before retracting during a climb, and before unfolding during the descent. After retracting or unfolding the landing gear, the useMags signal is again activated so that the signals from the magnetometers 126 are processed at the navigation system 100.

The operation of the freeIntegrate and the useMags signals illustrated in FIG. 11 is merely illustrative. These signals may be turned on or off during other operations or for other reasons. For example, the signals may be turned off after diagnosing the sensors if the sensors are not functioning correctly or after receiving user inputs indicating that inputs from certain sensors be disabled. The useGPS signal may also be turned off when known GPS reception problems exist or anticipated high-g vehicle dynamics will cause the GPS receiver to lose lock on space vehicle tracking. The enabling or disabling of sensor signals or EKF correction may be configured depending on the characteristics of the vehicles and operational status of the vehicle. Therefore, the navigation system may more accurately and robustly determine the navigation state of the vehicle.

The switching of navigation modes and the DPC framework according to embodiments allow selective use of sensor signals and setting of parameters to enhance accuracy and robustness of the navigation system. The navigation system may also operate under a reduced state navigation mode that uses less computational resources compared to a full state navigation mode. By operating in the reduced state navigation mode and operating in full state navigation mode when needed, resource-constrained computing devices can effectively estimate the navigation state of the vehicle without exhausting its computational resources.

APPENDIX ti[15] = index into lookup tables
ct[i][2] = calibration tables (temp and scale)
raw[6] = uncalibrated inertial sensor values
temp[6] = 4-temperature sensor values (2 values duplicated)
misalign[12] = off-diagonal alignment matrix values
scaled[6] = calibrated sensor values
fa, fas = forward facing axis
ra, ras = right facing axis
da, das = down facing axis
orient[6] = oriented sensor values
Lookup Temperature Bias Table For each inertial sensor i:
  B Index = ti[i]
  E Index = B Index+1
  BCount = ct[B Index][0]
  ECount = ct[E Index][0]
  if(temp[i]<BCount)
    do until break:
      if(B Index==ti[i] break
      B Index--
      BCount=ct[B Index][0]
      if(TmpInput>=BCount) break
    ti[i]=B Index
    E Index = B Index+1
    ECount = ct[E Index][0]
  else if (TmpInput>ECount)
    do until break:
      if(E Index==(ti[i+1]−1) break
      E Index++

APPENDIX-continued

```
        ECount = ct[E Index][0]
        if(TmpInput<=ECount) break
    B Index = E Index-1
    ti[i]=B Index
    BCount = ct[B Index][0]
BValue=ct[B Index][1]
EValue=ct[E Index][1]
bias[i] = (double)(EValue-BValue)(double)(ECount-BCount)
bias[i] = BValue + (int32)(temp[i]-BCount)*bias[i]
Lookup Scale Factor Table For each inertial sensor i:
    raw[i] -= bias[i]
    B Index = ti[i+6]
    E Index = B Index+1
    BCount = ct[B Index][0]
    ECount = ct[E Index][0]
    if(raw[i]<BCount)
        do until break:
            if(B Index==ti[i+6]) break
            B Index--
            BCount=ct[B Index][0]
            if(raw[i]>=BCount) break
        ti[i+6]=B Index
        E Index = B Index+1
        ECount = ct[E Index][0]
    else if (raw[i]>ECount)
        do until break:
            if(E Index==(ti[i+7]-1) break
            E Index++
            ECount =ct[E Index][0]
            if(raw[i]<=ECount) break
        B Index = E Index-1
        ti[i+6]=B Index
        BCount = ct[B Index][0]
    BValue=ct[B Index][1]
    EValue=ct[E Index][1]
    scaled[i] = (double)(EValue-BValue)(double)(ECount-BCount)
    scaled[i] = BValue + (double)(raw[i]-BCount)*scaled[i]
Misalignment For each sensor set i,i+1,i+2:
    tempX = scaled[i]
    tempY = scaled[i+1]
    scaled[i] -= misalign[2*i]*tempY + misalign[2*i+1]*scaled[i+2]
    scaled[i+1] -= misalign[2*i+2]*tempX + misalign[2*i+3]*scaled[i+2]
    scaled[i+2] -= misalign[2*i+4]*tempX + misalign[2*i+5]*tempY
Orientation For each sensor set i,i+1,i+2:
    if(fas) orient[i] = -scaled[fa]
    else orient[i] = scaled[fa]
    if(ras) orient[i+1] = -scaled[(ra+1)%3]
    else orient[i+1] = scaled[(ra+1)%3]
    if(das) orient[i+2] = -scaled[(da+2)%3]
    else orient[i+2] = scaled[(da+2)%3]
```

What is claimed is:

1. A computer-implemented method for estimating navigation state information of a vehicle, comprising:
selecting a first navigation algorithm for computation of the navigation state information;
generating a first correction signal based on a first set of sensor inputs;
computing the navigation state information based on the first navigation algorithm and the first correction signal;
switching to a second navigation algorithm for computation of the navigation state information responsive to detecting a predetermined event;
generating a second correction signal based on a second set of sensor inputs;
computing the navigation state information based on the second navigation algorithm and the second correction signal; and
outputting the navigation state information.

2. The method of claim 1 further comprising initializing parameters for the second correction signal based on the navigation state information computed by the first navigation algorithm using the first correction signal.

3. The method of claim 1 wherein the predetermined event comprises determination that at least one sensor input is unavailable or unreliable.

4. The method of claim 1 wherein the first navigation algorithm and the second navigation algorithm implement an Extended Kalman Filter (EKF).

5. The method of claim 4, further comprising:
generating propagation information representing attitude quaternion and tangent velocities of the vehicle based on the first correction signal or the second correction signal; and
generating state propagation information based on the propagation information, the state propagation information representing vehicle orientation, velocity, position, and sensor calibration.

6. The method of claim 1, wherein the first set of sensor inputs comprises a magnetometer signal received from a magnetometer and an inertial sensor signal received from an inertial sensor assembly.

7. The method of claim 6, further comprising:
computing an accelerometer adjustment factor based on a yaw rate of the vehicle; and
adjusting the first correction signal based on the accelerometer adjustment factor.

8. The method of claim 1, wherein the second set of sensor inputs comprises a magnetometer signal received from a magnetometer and a Global Positioning System (GPS) information received from a GPS receiver.

9. The method of claim 1, receiving setting inputs associated with characteristics or application of the vehicle to set parameters used in the first navigation algorithm and the second navigation algorithm.

10. The method of claim 1, wherein the setting inputs comprise at least one of an inertial sensor low-pass filter bandwidth, packet output data, packet output rate, system orientation, static yaw tracking behavior, vehicle track pointing offset, magnetometer environmental bias and scale factor, static and dynamic activity, inertial sensor over-range behavior, turn switch threshold, and selection regarding use of sensors.

11. A navigation system, comprising:
an Extended Kalman Filter (EKF) navigation module comprising:
a first navigation module configured to compute navigation state information of a vehicle by processing a first correction signal using a first algorithm, the first correction signal generated using a first set of sensor inputs; and
a second navigation module configured to compute the navigation state information of the vehicle by processing a second correction signal using a second algorithm, the second correction signal generated using a second set of sensor inputs;
a navigation mode switching module for selecting the first navigation module or the second navigation module based on a predetermined criteria; and
sensors generating the first set of sensor inputs and the second set of sensor inputs.

12. The navigation system of claim 11, wherein the predetermined criteria comprising whether a sensor input from a sensor is available and reliable.

13. The navigation system of claim 11, further comprising:
a time propagation module generating propagation information representing attitude quaternion and tangent velocities of the vehicle based on the first correction signal or the second correction signal; and
a state propagation module generating state propagation information based on the propagation information, the state propagation information representing vehicle orientation, velocity, position, and sensor calibration.

14. The navigation system of claim 11, wherein the first set of sensor inputs comprises a magnetometer signal generated by a magnetometer and an inertial sensor signal generated by an inertial sensor assembly.

15. The navigation system of claim 14, wherein the EKF navigation module is further configured to:
compute an accelerometer adjustment factor based on a yaw rate of the vehicle; and
adjust the first correction signal based on the accelerometer adjustment factor.

16. The navigation system of claim 11, wherein the second set of sensor inputs comprises a magnetometer signal generated by a magnetometer and a Global Positioning System (GPS) information generated by a GPS receiver.

17. The navigation system of claim 11, further comprising a communication module configured to receive setting inputs associated with characteristics or application of the vehicle, parameters used in the first navigation module and the second navigation module adjusted according to the setting inputs.

18. The navigation system of claim 11, wherein the setting inputs comprise at least one of an inertial sensor low-pass filter bandwidth, packet output data, packet output rate, a system orientation, static yaw tracking behavior, an vehicle track pointing offset, magnetometer environmental bias and scale factor, static and dynamic activity, inertial sensor over-range behavior, turn switch threshold, and selection regarding use of sensors.

19. A computer readable storage medium structured to store instructions executable by a processor in a computing device in a navigation system, the instructions, when executed cause the processor to:
select a first navigation algorithm for computation of the navigation state information;
generate a first correction signal based on a first set of sensor inputs;
compute the navigation state information based on the first navigation algorithm and the first correction signal;
switch to a second navigation algorithm for computation of the navigation state information responsive to detecting a predetermined event;
generate a second correction signal based on a second set of sensor inputs;
compute the navigation state information based on the second navigation algorithm and the second correction signal; and
output the navigation state information.

20. The computer readable storage medium of claim 19, further storing instructions, when executed cause the processor to receive setting inputs associated with characteristics or application of the vehicle to set parameters used in the first navigation module and the second navigation module.

* * * * *